US012630663B2

(12) United States Patent
Van Aert et al.

(10) Patent No.: US 12,630,663 B2

(45) Date of Patent: May 19, 2026

(54) AQUEOUS POLYURETHANE RESIN DISPERSION

(71) Applicant: AGFA NV, Mortsel (BE)

(72) Inventors: Hubertus Van Aert, Mortsel (BE); Marie Lehericey, Mortsel (BE)

(73) Assignee: AGFA NV, Mortsel (BE)

( * ) Notice: Subject to any disclaimer, the term of this patent is extended or adjusted under 35 U.S.C. 154(b) by 764 days.

(21) Appl. No.: 18/008,717

(22) PCT Filed: May 25, 2021

(86) PCT No.: PCT/EP2021/063852

§ 371 (c)(1),
(2) Date: Dec. 7, 2022

(87) PCT Pub. No.: WO2021/249764

PCT Pub. Date: Dec. 16, 2021

(65) Prior Publication Data

US 2023/0220145 A1 Jul. 13, 2023

(30) Foreign Application Priority Data

Jun. 10, 2020 (EP) .................................... 20179238

(51) Int. Cl.

| | |
|---|---|
| ***C08G 18/08*** | (2006.01) |
| ***B41M 5/00*** | (2006.01) |
| ***C08G 18/10*** | (2006.01) |
| ***C08G 18/12*** | (2006.01) |
| ***C08G 18/24*** | (2006.01) |
| ***C08G 18/32*** | (2006.01) |
| ***C08G 18/40*** | (2006.01) |
| ***C08G 18/42*** | (2006.01) |

(Continued)

(52) U.S. Cl.

CPC ....... *C08G 18/0814* (2013.01); *B41M 5/0017* (2013.01); *C08G 18/10* (2013.01); *C08G 18/12* (2013.01); *C08G 18/246* (2013.01); *C08G 18/3206* (2013.01); *C08G 18/4018* (2013.01); *C08G 18/4213* (2013.01); *C08G 18/4833* (2013.01); *C08G 18/6622* (2013.01); *C08G 18/6655* (2013.01); *C08G 18/7837* (2013.01); *C08L 75/04* (2013.01); *C09D 11/322* (2013.01); *C09D 11/38* (2013.01); *C09D 11/40* (2013.01); *C09D 175/04* (2013.01); *D06P 1/5285* (2013.01); *D06P 3/32* (2013.01); *D06P 3/3293* (2013.01); *D06P 5/30* (2013.01)

(58) Field of Classification Search

CPC C08G 18/0814; C08G 18/10; C08G 18/3206; C08G 18/4213; C08G 18/12; C08G 18/246; C08G 18/4018; C08G 18/4833; C08G 18/6622; C08G 18/6655; C08G 18/7837; C09D 11/322; C09D 11/38; C09D 11/40; C09D 175/04; B41M 5/0017; C08L 75/04; D06P 1/5285; D06P 3/32; D06P 3/3293; D06P 5/30

See application file for complete search history.

(56) References Cited

U.S. PATENT DOCUMENTS

2008/0090949 A1 4/2008 Nagao et al.
2009/0233065 A1 9/2009 Komatsu (Continued)

FOREIGN PATENT DOCUMENTS

WO 2014/076073 A1 5/2014
WO 2019/105786 A1 6/2019

OTHER PUBLICATIONS

European Patent Office, International Search Report in International Patent Application No. PCT/EP2021/063852, mailed Aug. 10, 2021, 3 pp.

(Continued)

*Primary Examiner* — Rabon A Sergent

(74) *Attorney, Agent, or Firm* — Leydig, Voit & Mayer, Ltd.

(57) ABSTRACT

An aqueous polyurethane resin dispersion, the polyurethane resin is obtainable by reacting an allophanate based isocyanate according to general formula I or II, optionally a polyether diol, a polyol containing a quaternary N-atom or tertiary amino group and a polyol selected from the group consisting of polyester polyol, polyether polyol, polycarbonate polyol, a polyacrylate polyol, a polyolefin and a polyamide polyol. The polyurethane resin is suitable as a resin in treatment liquids of substrates and images made by inkjet printing.

general formula I

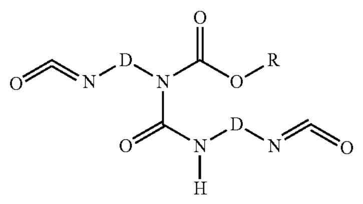

general formula II

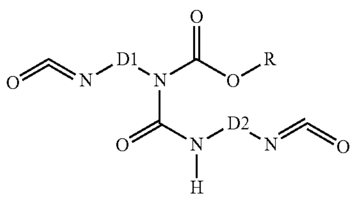

19 Claims, No Drawings

(51) Int. Cl.

| | |
|---|---|
| ***C08G 18/48*** | (2006.01) |
| ***C08G 18/66*** | (2006.01) |
| ***C08G 18/78*** | (2006.01) |
| ***C08L 75/04*** | (2006.01) |
| ***C09D 11/322*** | (2014.01) |
| ***C09D 11/38*** | (2014.01) |
| ***C09D 11/40*** | (2014.01) |
| ***C09D 175/04*** | (2006.01) |
| ***D06P 1/52*** | (2006.01) |
| ***D06P 3/32*** | (2006.01) |
| ***D06P 5/30*** | (2006.01) |

(56) References Cited

U.S. PATENT DOCUMENTS

2014/0378609 A1 12/2014 Yamasaki et al.
2020/0377750 A1* 12/2020 Yatake .................. C09D 11/54

OTHER PUBLICATIONS

European Patent Office, Written Opinion in International Patent Application No. PCT/EP2021/063852, mailed Aug. 10, 2021, 5 pp.

* cited by examiner

AQUEOUS POLYURETHANE RESIN DISPERSION

CROSS-REFERENCE TO RELATED APPLICATIONS

This patent application is the U.S. national phase of copending International Patent Application No. PCT/EP2021/063852, filed May 25, 2021, which claims the benefit of European Patent Application No. 20179238.9, filed Jun. 10, 2020.

TECHNICAL FIELD

The present invention relates to an aqueous polyurethane resin dispersion and more specifically to the use of the polyurethane resin in treatment liquids of substrates for ink jet printing with aqueous ink jet inks or treatment liquids of printed images.

BACKGROUND ART

In recent years, inkjet techniques have been increasingly utilized for industrial printing applications such as displays, posters, bulletin boards, packaging, textile, etc. In such applications durability such as light fastness, water resistance, and wear resistance are important requirements of the printed images and pigment based inks therefore have been developed.

Inks, such as solvent-based inkjet inks using an organic solvent as a vehicle, and ultraviolet curable inkjet inks including a polymerisable monomer as a main component have been used widely in industrial applications.

However, the solvent-based inkjet inks are not environmentally preferable because the solvent is evaporated in the atmosphere. The ultraviolet curable inkjet inks have limited application fields because they may have skin sensitizing properties depending on the monomer used and an expensive ultraviolet irradiation apparatus is required to be incorporated to the main body of a printer.

In view of such background, there have been developed pigment based aqueous inks for inkjet recording capable of being directly used for printing on porous and non-porous substrates and which give less environmental load.

Adhesion of aqueous resin based inks directly on non-porous substrates or substrates showing a low absorbability remains however difficult compared to UV technology.

WO2019/105786 teaches a primer solution comprising an aqueous polyurethane resin, having a cationic group and a polyalkylene oxide in a side chain thereof. The resin achieves an improved adhesion to non-porous substrates and the cationic group assures a fixing property of the colorants comprised in the aqueous inkjet inks and which are jetted onto the primer liquid. However, these primers still suffer from insufficient fixing properties and adhesion to non-porous substrates or substrates with low absorbability.

US2009/0233065 discloses an ink jet pre-treatment liquid containing a cationic polyurethane. The cationic polyurethane is obtained by making use of a chain extending agent having a tertiary amino group, hence bringing a cationic group in the main chain of the resin. The resin assures a good adhesion of the resin to non-porous substrates. Storage stability of the pre-treatment liquid containing the cationic polyurethane is still to be improved US2008/0090949 discloses an ink-jet receiving agent including a cationic polyurethane resin aqueous dispersion. The tertiary amino group containing polyol having secondary OH-groups, used in the preparation of the resin, will have limited reactivity compared to a polyol having primary OH-groups. The limited reactivity will limit the length of the polymer chains and hence reduce the advantageous physical properties of the resin such as adhesion, scratch resistance, and mechanical performance. Furthermore, the method of preparation of the cationic polyurethane as disclosed in US2008/0090949 is laborious, since first the tertiary amino group containing polyol needs to be prepared in advance.

As described above, there is great need for the development of a treatment liquid of substrates for ink-jet printing with aqueous pigment inks which show improved color fixing properties leading to excellent printing quality (color saturation increase, coalescence and bleeding decrease) and which provides printed images showing excellent physical properties such as flexibility and adhesion to substrates and which can be produced via an efficient synthesis method.

SUMMARY OF INVENTION

It is an objective of the invention to provide a solution for the above stated problems. The object has been achieved by incorporating a polyurethane resin dispersion as defined in Claim 1 into an aqueous treatment liquid.

According to another aspect, the present invention includes an aqueous treatment liquid according to Claim 9, wherein the polyurethane resin is included as a binder.

According to another aspect, the present invention includes an inkjet recording method using the polyurethane resin as defined in Claim 1. This method is defined in Claim 12.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

A. Aqueous Polyurethane Resin Dispersion

The aqueous polyurethane resin dispersion of the present invention is characterised by the fact that the resin comprises a unit derived from an allophanate based isocyanate, a tertiary amino group or quaternary N-atom, and a unit derived from a polymeric polyol selected from the group consisting of polyester polyol, polyether polyol, polycarbonate polyol, polyolefin polyol, polyacrylate polyol and polyamide polyol. Optionally, a polyether is present in a side chain of the polyurethane backbone. Preferably the tertiary amino group is protonated such that a cationic group is present in the resin. Both the cationic group and the polyether in the side chain increase the dispersibility and colloidal stability of the resin in water. The polyester urethane resin of the invention is preferably obtainable by reacting an allophanate based isocyanate with a polyester polyol containing aromatic moieties, a polyether diol, a polyol containing a tertiary amino group or quaternary N-atom.

A.1. Allophanate Based Isocyanates

The PU-resin dispersion according to the invention is obtainable by reacting an allophanate based isocyanate according to general formula I or II, optionally a polyether diol, a polyol containing a quaternary N-atom or tertiary amino group and a polyol selected from the group consisting of polyester polyol, polyether polyol, polycarbonate polyol, polyacrylate polyol, polyolefin polyol and a polyamide polyol.

The allophanate based isocyanate is formed by reaction of a di- or polyisocyanate with an alcohol (ROH) according to the following reaction:

General formula I

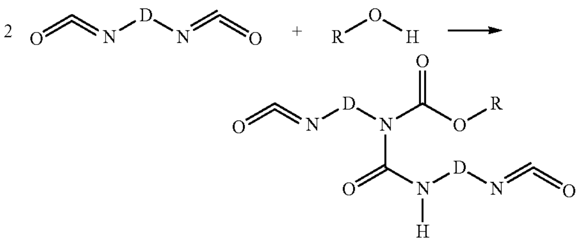

Wherein:

D represents a linking group having at least 5 carbon atoms

R is a substituted or unsubstituted alkyl group, a substituted or unsubstituted alkenyl group, a substituted or unsubstituted alkynyl group, a substituted or unsubstituted cycloaliphatic group, a substituted or unsubstituted alkylaryl group, a substituted or unsubstituted aryl or heteroaryl group.

If a mixture of 2 different isocyanates are used in the above reaction, a heteroallophanate is obtained, wherein D1≠D2:

General formula II

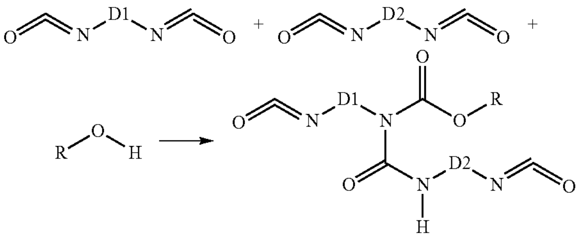

Wherein:

D1 and D2, each independently represent a linking group having at least 5 carbon atoms R represents the same groups as above.

Preferably, D, D1 and D2 are independently from each other, represented by the general formula III, IV, V or VI.

general formula III

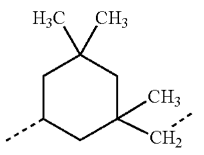

general formula IV

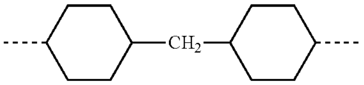

-continued general formula V

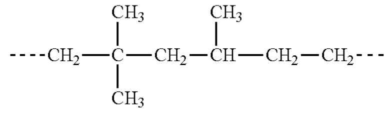

general formula VI $$---(CH_2)_n---$$

Wherein the dashed lines represent the linking with the N-atoms in general formula I and II an n is an integer from from 5 to 11, for n=5 one can use pentane-1,5-diisocyanate (eg. STABiO PDI from Mitsui) and for n=6 one can use hexamethylene diisocyanate (Desmodur H from Covestro).

Examples of suitable linking groups are shown below, the location where the linking group is bonded to the nitrogen atom in general formula I and II is shown in the structure by a dashed line. Preferred linking groups are derived from isophorone diisocyanate (IPDI) corresponding to general formula III, 4,4'-dicyclohexylmethane diisocyanate (H12MDI) corresponding to general formula IV, 2,4,4'-trimethyl-1,6-hexamethylene diisocyanate (TMDI) corresponding to general formula V, and hexamethylene diisocyanate (HMDI) corresponding to general formula VI with n=6 or pentamethylene diisocyanate (PDI) corresponding to general formula VI with n=5.

R—OH is preferably an alcohol such as n-butanol, n-propanol, 2-ethyl hexanol, n-octanol, 2-methylpropanol, 2-hydroxy ethyl methacrylate, 2-hydroxy ethyl acrylate, lauryl alcohol, coco alkyl alcohol, stearyl alcohol, tridecyl alcohol, isotridecyl alcohol, cetyl alcohol, 1-icosanol, isopropyl alcohol, and C12-, C16-, C18-, C20-, C24-, C28- or C32-Guerbet alcohols.

Other preferred allophanate based isocyanates are ones containing a linking group D1, D2 or D being a cyclo aliphatic ring, such as derived from IPDI or H12MDI.

Examples of suitable allophanate based isocyanates are: Tolonate X FLO100, partially biobased allophanate based on HDI (CAS registry number 1628596-20-2) produced by Vencorex Chemicals in France and Desmodur XP 2565, allophanate based on IPDI and butan-1-ol and pentan-1-ol and 2-ethylhexan-1-ol (CAS Registry number 1108168-72-4) produced by Covestro in Germany. Main structures present in Desmodur XP2565 are according to formula VII, VIII an IX:

Formula VII

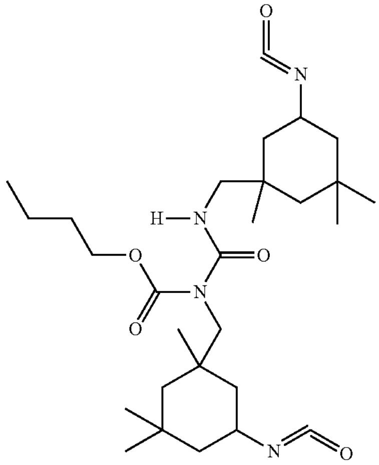

-continued

Formula VIII

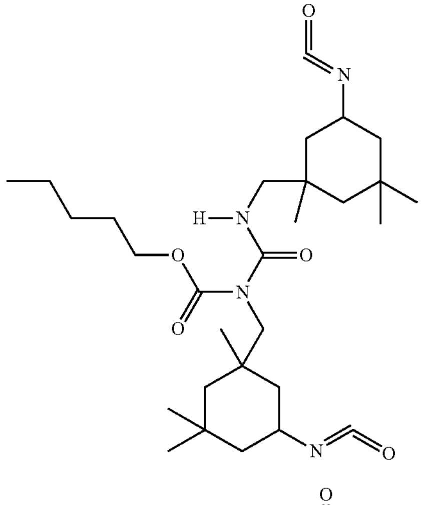

Formula IX

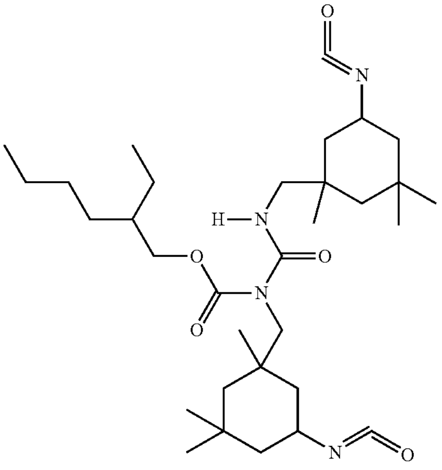

Other preferred allophanate structures are: (6-isocyanatohexyl)[[(6-isocyanatohexyl)amino]carbonyl]-, Carbamic acid hexyl ester (CAS registry number 455258-01-2), N-(6-isocyanatohexyl)-N-[[(6-isocyanatohexyl)amino]carbonyl]-, 2 Carbamic acid ethylhexyl ester (CAS registry number 455258-02-3), N-(6-isocyanatohexyl)-N-[[(6-isocyanatohexyl)amino]carbonyl]-, Carbamic acid butyl ester (CAS registry number 215853-93-3), N-(6-isocyanatohexyl)-N-[[(6-isocyanatohexyl)amino]carbonyl]-, Carbamic acid 2-methylpropyl ester (CAS registry number 1642128-21-9).

Allophanates based on HDI and MDI are rather reactive, and less preferred than e.g IPDI based allophanates. Desmodur XP 2860 available from Covestro in Germany, is an allophanate based on HDI (mix of C3/C4/C5 allophanate). An example of a MDI based allophanate are Mondur MA-2300 and Mondur MA-2902 available from Covestro in Germany. The reactivity of the allophanate can also be controlled by using a mixture of different allophanates. Eg. mixing an IPDI based allophanate like Desmodur XP2565 with Desmodur XP 2860. In some PU synthesis reactions, the use of Desmodur XP 2860 will lead to too high viscosities and mixing with the less reactive XP2565 can offer advantages and better applicability in the dispersion preparation.

Other preferred allophanate based isocyanates are reactive allophanate structures such as alkoxysilane modified allophanate structures as described in the European patent application EP 3 263 618 A1

A.2. Polyols Containing a Tertiary Amino Group and/or a Quaternary N-Atom

Examples of the cationic group in the polyurethane resin of the invention can be selected from protonated amines, protonated nitrogen containing heteroaromatic compounds, quaternized tertiary amines, N-quaternized heteroaromatic compounds, quaternized tertiary amines and N-quaternized heteroaromatic compounds being more preferred.

In one embodiment of the invention, a polyol is used containing a tertiary amino group, ie. a precursor for obtaining a cationic group after protonation using an acid, e.g. acetic acid.

Preferably the polyol is a diol, which can react with the allophanate based isocyanate in order to give urethane bonds of the prepared polyurethane resin and which comprises a tertiary ammonium group or quaternary N-atom. The tertiary amino group or quaternary N-atom can be present in the main chain or in the side chain of the prepared polyurethane resin. In the first case, the tertiary ammonium group or quaternary N-atom is present between two reactive OH-groups of the diol. In the second case, the tertiary ammonium group or quaternary N-atom is present as a side group onto a carbon chain between two reactive OH-groups of the diol. Reactive OH-groups are groups which can react with a polyisocyanate.

After preparation of the polyurethane in a solvent like acetone, acetonitrile or MEK, the tertiary amino group can be converted to a quaternary ammonium group by protonation with an acid, e.g. acetic acid. Subsequently water is added during a high shear treatment or stirring to obtain an aqueous dispersion. Subsequently the organic solvent (e.g. acetone) is removed by distillation under reduced pressure.

Examples of suitable diols having a tertiary amino group or a N-atom in the main chain, for introducing a cationic group in the resin are: N-Methyldiethanolamine (e.g. Genocur MDEA available via Rahn AG): CAS Registry Number 105-59-9, 2-[(2-Hydroxyethyl)phenylamino]ethanol, CAS Registry Number 120-07-0, 2-[Ethyl(2-hydroxyethyl)amino]ethanol, CAS Registry Number 139-87-7, 2,2'-(Butylimino)diethanol, CAS Registry Number 102-79-4, Diethanol-m-toluidine, CAS Registry Number 91-99-6, N,N-Dihydroxyethyl-p-toluidin (DHEPT available via Saltigo): CAS Registry Number 3077-12-1.

Examples of suitable diols having a tertiary group or N-atom in the side chain for introducing a cationic group in the resin are: 2-[(Dimethylamino)methyl]-1,3-propanediol, CAS Registry Number 69040-18-2, 2-Methyl-2-dimethylaminomethyl-1,3-propanediol, CAS Registry Number 36254-31-6, 2-Ethyl-2-dimethylaminomethyl-1,3-propanediol, CAS Registry Number 25941-41-7, 2-Diethylaminoethyl-2-methyl-1,3-propanediol, CAS Registry Number 29006-31-3, 2-Diethylaminomethyl-2-ethyl-1,3-propanediol, CAS Registry Number 26102-95-4, 3-[methyl(phenylmethyl)amino]-1,2-propanediol, CAS Registry Number 60278-98-0. Diols having a N-atom in the side chain have the advantage that the colloidal stabilisation of the produced polyurethane resin is further improved with respect to the diols having a N-atom in the main chain.

When using a tertiary amino group containing polyol, the amino group can be converted to a cationic group by protonation using an inorganic or organic acid. Examples of inorganic acids are hydrochloric acid, perchloric acid, sulphuric acid, hydrobromic acid, hydroiodic acid, phosphoric acid, nitric acid, boric acid, etc. Examples of organic acids include: acetic acid, formic acid, propionic acid, citric acid, oxalic acid, ascorbic acid, lactic acid, benzoic acid, toluene sulphonic acid, phenol, salicylic acid, acrylic acid, maleic acid, itaconic acid, stearic acid, glutamic acid, sulfoethyl methacrylate, carboxyethyl acrylate or other organic compounds with an acidic proton such as sulphonamides or thiols.

Examples of diols having a quaternary N-atom are: N,N-Dimethyldiethanolamine=CAS Registry Number 44798-79-0, with different counter ions e.g. Bis(2-hydroxyethyl)dimethylammonium methanesulfonate=CAS registry number 152390-17-5 N-Methyl-N-benzyl-N,N-di(hydroxyethyl) ammonium chloride=CAS Registry Number 21056-86-0, N,N-bis(2-hydroxyethyl)-N-methyl-benzenemethanaminium, bromide (1:1)=CAS registry number 1254832-90-0, Benzoxonium chloride=CAS registry number 19379-90-9, N,N-bis(2-hydroxyethyl)-N-methylbenzenemethanaminium chloride (1:1)=CAS registry number 21056-86-0, N-hexadecyl-N,N-bis(2-hydroxyethyl)-benzenemethanaminium chloride (1:1)=CAS registry number 65151-47-5, N,N-bis(2-hydroxyethyl)-N-methyl-1-dodecanaminium chloride (1:1)=22340-01-8, 2,2-diethyl-2,3-dihydro-1H-isoindolium=CAS registry number 768297-35-4, 2,2-dimethyl-2,3-dihydro-1H-Isoindolium chloride and 2,2-dimethyl-2,3-dihydro-1H-Isoindolium bromide.

Other examples of compounds having a quaternary N-atom are pyridinium salts, e.g. 1,1'-Bis(β-hydroxyethyl)-4,4'-bipyridylium diiodide=CAS registry number 25015-61-6, [p-(2,3-Dihydroxypropoxy)phenyl]trimethylammonium bromide=CAS registry number 109732-00-5, [m-(2,3-Dihydroxypropoxy)phenyl] trimethylammonium bromide=CAS registry number 109731-98-8, [2-[p-(2,3-Dihydroxypropoxy)phenoxy]ethyl]trimethylammonium iodide=CAS registry number 110056-43-4 and quaternary amino diols having the quaternary amino group in the side chain, e.g. 2,3-Dihydroxy-N,N,N-trimethyl-1-propanaminium=CAS registry number 44814-66-6, N-(2,3-dihydroxypropyl)-N,N-dimethyl-benzenemethanaminium, chloride (1:1)=CAS registry number 417702-31-9 or N-(2,3-dihydroxypropyl)-N,N-dimethyl-benzenemethanaminium, hydroxide (1:1) =CAS registry number 1043415-27-5.

In a further preferred embodiment, the amino diol having a tertiary amino group having an benzyl group, e.g. N,N-bis(2-hydroxyethyl)-N-methyl-benzenemethanaminium, bromide (1:1), ie. CAS registry number 1254832-90-0, N-dodecyl-N,N-bis(2-hydroxyethyl)-benzenemethanaminium, chloride (1:1)=CAS registry number 19379-90-9, or N-(2,3-dihydroxypropyl)-N,N-dimethyl-benzenemethanaminium, chloride (1:1)=CAS registry number 417702-31-9.

A.3. Polymeric Polyol

Preferred polymeric polyols include polycarbonate polyols, polyether polyols, polyacrylate polyols, polyester polyols, polyamide polyols and polyolefin polyols. More preferred polymeric polyols are polyester polyol, most preferred are polyester diols, obtained by reacting a polycarboxylic acid and a polyol.

The polyester polyol is a resin formed by an esterification reaction or transesterification reaction between at least one aromatic polycarboxylic acid component and at least one polyol component. Specific examples of the aromatic polycarboxylic acid include dibasic acids such as phthalic acid, isophthalic acid, terephthalic acid, 2,6-Naphthalenedicarboxylic acid, 1,4-naphthalenedicarboxylic acid, 1,5-naphthalenedicarboxylic acid; tri- or higher-valent polybasic acids such as trimellitic acid and pyromellitic acid; and acid anhydrides thereof, for example, phthalic anhydride, trimellitic anhydride, pyromellitic anhydride; and the like. As the aromatic polycarboxylic acid component, one or more dibasic acids selected from the dibasic acids mentioned above, lower alkyl ester compounds of these acids, and acid anhydrides are mainly used. If necessary, a monobasic acid such as benzoic acid, crotonic acid or p-t-butyl benzoic acid; a tri- or higher valent polycarboxylic acid such as trimellitic anhydride, methylcyclohexene tricarboxylic acid or pyromellitic anhydride; or the like can be further used in combination with the polycarboxylic acid component. It is preferred that the polyester is prepared using dicarboxylic acids which give linear polymer chains, in particular 1,4-terephthalic acid copolymers give a better performance regarding colloidal stability in aqueous medium, than phthalic acid anhydride copolymers. Besides terephthalic acids, one could use also other para- or linear substituted polycarboxylic acids to obtain the desired properties such as 2,6-naphthalenedicarboxylic acid or 1,5-naphthalenedicarboxylic acid.

The preferred carboxylic acid is an aromatic dicarboxylic acid such as terephthalic acid and isophthalic acid. The content of aromatic acids within the resin is equal to or higher than 30 mol % and preferably equal to or higher than 50 mol % with respect to the total amount of dicarboxylic acids or anhydrides. Treatment liquids comprising polyurethane resins obtained by reaction of polyesters polyols containing aromatic polycarboxylic acids do show an improved colloidal stability and lead to images with an improved solvent resistance and an improved dry and wet scratch resistance. The good results obtained with terephthalic acids and isophthalic acids has probably to do with obtaining a certain amount of crystallinity of the polyurethane resin or providing linear amorphous chains which contribute more to the desired physical properties such as scratch resistance and solvent resistance. Introducing phthalic acid anhydride or isophthalic acid in terephthalic acid based polyesters reduces the crystallinity or chain end-to-end distance and improves the solubility in organic solvents. For terephthalic acid based polyester polyols, it is preferred to use copolymers of terephthalic acid with isophthalic acid or phthalic acid anhydride, more preferably having at least 20 mol % isophthalic acid or phthalic acid anhydride units. For the same reason polyester polyols with only phthalic acid anhydride are less preferred than copolymers where terephthalic acid is incorporated. Polyester polyols based on only phtalic acid anhydride could be very soluble in the polymerization solvent for the PU preparation, but a dried coating will have also a lower solvent resistance. Therefore, it is preferred that the aromatic polyester polyol contains between 20 and 80 mol % of terephthalate groups on the basis of the total amount of dicarboxylic acids (or acid anhydrides) in the polyester polyol.

Very suitable polyester polyols containing terephthalic ester units and isophthalic ester units in a ratio of 1:1 mol % are: Dynacoll 7150 supplied by Evonik, Marl, Germany, Vylon 220 from Toyobo, Osaka Japan and Elitel 1401 obtained from Unitika Ltd Dusseldorf Germany.

In order to obtain the desired properties of the polyester polyol and using a high content of terephthalic acid, one could use also a mixture of dicarboxylic acids. For example, to reduce the crystallinity one could use a mixture of terephthalic acid and adipic acid. Consequently, one could use also polyester polyols based on a mixture of aromatic polycarboxylic acids and aliphatic dicarboxylic acids such as adipic acid, succinic acid, methylcyclohexene tricarboxylic acid, fumaric acid and sebacic acid or anhydrides such as tetrahydrophthalic acid anhydride, hexahydrophthalic acid anhydride, maleic acid anhydride and succinic acid anhydride.

Polyester polyols with a high content of terephthalic acid could have a poor solubility in the preparation solvent (e.g.

acetone) for the PU preparation or could have a too high degree of crystallinity in order to get good adhesive properties. In particular, this is the case when only non-branched diols are used for the polyester polyol, such as 1,2-ethylene glycol or 1,4-butane diol. When using terephthalic acid based polyester polyols with more than 35 mol % terephthalic acid, one can preferably use a mixture of different non-branched diols (e.g. a mixture of 1,2-ethylene glycol and 1,4-butane diol) or a mixture of a non-branched diol (e.g. ethylene glycol) with a branched diol (e.g. neopentyl glycol). When using mixtures of different diols for the polyester polyol, one could use high terephthalic acid contents, even up to 100 mol % based of the total dicarboxylic acid content.

Specific examples of the polyol component include diols such as ethylene glycol, diethylene glycol, propylene glycol, dipropylene glycol, 1,4-butanediol, neopentyl glycol, 1,5-pentanediol, 3-methyl-1,5-pentanediol, 1,4-hexanediol and 1,6-hexanediol; and tri- or higher-valent polyols such as glycerin, trimethylolethane, trimethylolpropane and pentaerythritol. For the polyol component, diols as mentioned above are mainly used, and if necessary, tri- or higher-valent polyols such as glycerin, trimethylolethane, trimethylolpropane and pentaerythritol can be further used in combination with the diols. Aromatic diols can also be used to increase the content of aromatic moieties in the polyester polyol. Suitable aromatic diols are: p-xylene glycol, 1,5-naphthalenedimethanol, 1,4-naphthalenedimethanol, 4,4'-bis(hydroxymethyl)biphenyl, bis(hydroxyethyl) terephthalate, bis(2-hydroxypropyl) terephthalate, 1,5-naphthalenedicarboxylic acid 1,5-bis(2-hydroxyethyl) ester, 4,4-bis(hydroxymethyl) diphenylmethane, 2,2-bis(4-β-hydroxyethoxyphenyl)propane (diethoxylated bisphenol A) and bis[p-(2-hydroxyethoxy)phenyl]methane.

Preferably diols with a Mw equal to or less than 400 are used together with the polyester polyol. These polyols can be used singly or as mixture of two or more kinds.

A.4. Polyether Diol

The polyether diol which can be present during the reaction between the allophanate based isocyanate, the polyol containing a quaternary N-atom or tertiary amino group and a polymeric polyol selected from the group consisting of polyester polyol, polyether polyol, polycarbonate polyol, polyolefin polyol, polyacrylate polyol and a polyamide polyol. The polyether diol will introduce a polyether as a side chain in the formed PU and will further improve colloidal stabilisation of the PU-resin dispersion in an aqueous vehicle.

This polyether diol can be obtained by addition polymerization of an alkylene oxide with at least one compound having two or more active hydrogen atoms. Examples of this compound include ethylene glycol, diethylene glycol, triethylene glycol, propylene glycol, trimethylene glycol, 1,3-butanediol, 1,4-butanediol, 1,6-hexanediol, glycerol, trimethylolethane and ethylolpropane. Examples of the alkylene oxide include ethylene oxide, propylene oxide, butylene oxide, styrene oxide, epichlorohydrin and tetrahydrofuran. Preferred polyether diols are compounds according to Formula X.

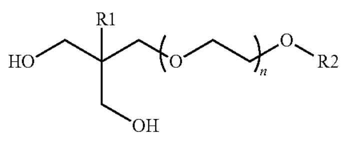

wherein R1 is methyl or ethyl, R2 is H or $C_1$-$C_4$ alkyl, more preferably $C_1$-$C_4$alkyl and n represents an integer from 5 to 50, more preferably from 10 to 40 and most preferably from 15 to 30.

The polyether diol preferably used in the present invention, is Ymer N120 or Tegomer D 3403, i.e. α-[2,2-bis(hydroxymethyl)butyl]-ω-methoxy-Poly(oxy-1,2-ethanediyl). These diols can be prepared from trimethylol propane oxetane (TMPO). A possible synthesis procedure is described by Fock, J.; Möhring, V., Polyether-1,2- and -1,3-diols as macromonomers for the synthesis of graft copolymers, 1. Synthesis and characterization of the macromonomers. *Die Makromolekulare Chemie* 1990, 191(12), 3045-3057.

In general, also other polyether 1,2- or 1,3-diols can be used. For a good stability the polyether graft needs to be well water soluble in order to give a good steric stabilisation. In the case of Ymer N120 the polyether is only composed of ethylene oxide segments, but this can also be a copolymer of different alkylene oxides. Furthermore, in the current macromonomer diol the end group is a methoxy group, this end group can also be other end groups such as a hydrophilic end group (such as anionic groups, e.g. carboxylic, sulphate, phosphate, etc. . . . ). The content of the polyether diol in the polyurethane resin is preferably 30 wt. % or less, but more than 1 wt. % with respect to the polyurethane resin, more preferably the polyether diol content is equal to or less than 15 wt. % and more than 2 wt. % with respect to the polyurethane resin. A content of the polyether diol of less than 30 wt. %, but more than 1 wt. % with respect to the polyurethane resin, has an additional improvement in scratch resistance and solvent resistance of the jetted and dried image with respect to polyether diol content outside this range.

A.5. Reaction Conditions

With regard to the conditions for the reaction between the allophanate based isocyanate, the polyol containing a tertiary ammonium group or quaternary N-atom, the optional polyether diol and the polymeric polyol, those conventionally used reaction conditions can be used without particular limitation.

Besides the preferred terephthalate containing polyester polyols also a mixture of different polymeric polyols can be used to adjust the physical properties, adhesion, mechanical performance, etc. Examples are e.g. polycarbonate polyols, polyether polyols, polyacrylate polyols, aliphatic polyester polyols, polyolefin polyols or other polymeric polyols. Examples of polycarbonate polyols are e.g. Oxymer C112, Oxymer M112 (available via Perstorp), Kuraray polyol C-2050, C-2090, C-1090 (available from Kuraray), Converge HMA-1 and Converge HMA-1 (available from Novomer Inc.), Duranol T6002, T6001, T5652, T5651, T5650J, T4672, T4671, T4692 and T4691 (available from Asahi kasei). Additional aliphatic polyester polyols, are e.g. regular (semi)crystalline or amorphous grades, e.g. based on hexane diol adipates (e.g. Dynacoll 7372 from Evonik) but also polyester polyols based on natural products such as polyester polyols made by using dimer acid or dimer diols (e.g. trade name Priplast from Croda), examples are Priplast 3192 and Priplast 1838. The raw material used to prepare certain Priplast grades, i.e. dimer diols with trade name Pripol can also be used as monomer in the PU synthesis to modify the physical properties and adhesive properties.

In the reaction between the polyester polyol and the organic polyisocyanate compound, if necessary, a diol with Mw equal to or less than 400 can be used. Examples of suitable diols are: ethylene glycol, diethylene glycol, propylene glycol, dipropylene glycol, 1,4-butanediol, neopentyl glycol, 1,5-pentanediol, 3-methyl-1,5-pentanediol, 1,4-hexanediol and 1,6-hexanediol; and tri- or higher-valent polyols such as glycerin, trimethylolethane, trimethylolpropane and pentaerythritol. 1,4-butane diol is most preferred.

Examples of the organic solvent used for the reaction between the polyester polyol, the polyether diol, the polyol comprising a tertiary amino group or quaternary N-atom and the organic polyisocyanate compound, here include ketones such as acetone and methyl ethyl ketone, ethers such as tetrahydrofuran and dioxane, acetates such as ethyl acetate and butyl acetate, nitriles such as acetonitrile, and amides such as dimethyl formamide, N-methylpyrrolidone and N-ethylpyrrolidone. These may be used singly or in combinations of two or more.

Using higher molecular weight polyether diols than Ymer120N will give more phase separation, providing a better water dispersibility. However, for the making of the polyurethane resin, it is more difficult to dissolve these polyols in de organic solvent, e.g. acetone. This can be overcome by using a co-solvent during the polycondensation reaction. A preferred co-solvent is 2-pyrrolidon or N-methylpyrrolidone.

The treatment liquid composition of the invention contains the polyurethane resin as an essential component. Therefore, the polyurethane resin is preferably dispersed in water to obtain an aqueous dispersion of the polyurethane resin. Every dispersing technology suitable for preparing aqueous dispersions may be used.

B. Treatment Liquid Composition

The treatment liquid according to the present invention contains the polyurethane resin as described in § A, and water. Additional components which may be added to the treatment liquid are given below. The amount of polyurethane resin in the treatment liquid is preferably equal to or lower than 30 wt. % and equal to or higher than 1 wt. %. The treatment liquid can be applied onto the substrate or to the printed images by means of a coating technique, a spraying technique or a jetting technique.

B.1. Water Soluble Organic Solvent

The treatment liquid of the invention may contain, besides water as a solvent, also a water-soluble organic solvent. Examples of water-soluble organic solvents include polyhydric alcohols such as diethylene glycol, triethylene glycol, dipropylene glycol, 1,3-propanediol, 1,3-butanediol, 1,4-butanediol, 2,2-dimethyl-1,3-propanediol, 2-methyl-1,3-propanediol, 1,2-pentanediol, 2,4-pentanediol, 1,5-pentanediol, 1,6-hexanediol, 2-ethyl-1,3-hexanediol, 1,2-hexanediol and 2,5-hexanediol, polyhydric alcohol alkyl ethers such as dipropylene glycol n-propyl ether, tripropylene glycol methyl ether, tripropylene glycol n-propyl ether, propylene glycol phenyl ether, triethylene glycol methyl ether, triethylene glycol methyl ether, triethylene glycol ethyl ether, diethylene glycol n-hexyl ether and ethylene glycol phenyl ether, and nitrogen-containing heterocyclic compounds such as 2-pyrrolidone and N-methylpyrrolidone.

Other preferred water soluble organic solvents include ethylene glycol, propylene glycol, 1,2-butanediol, 2,3-butanediol, 2-methyl-2,4-pentanediol, dipropylene glycol monomethyl ether, propylene glycol n-butyl ether, propylene glycol t-butyl ether, diethylene glycol methyl ether, ethylene glycol n-propyl ether and ethylene glycol n-butyl ether.

The content of the water-soluble organic solvent, in the aqueous ink jet ink is preferably less than 70 wt. %. If the content exceeds 70% by mass, the aqueous treatment liquid loses its water based, hence more green character.

B.2. Surfactant

In the treatment liquid of the present invention, a surfactant may be added in order to ensure wettability onto the substrate. The amount of the surfactant added is preferably 0.1 wt. % to 5 wt. % as an active component in the ink.

If the amount added is below 0.1% by mass, wettability onto the substrate is not sufficient and causes degradation in image quality and in adhesion to the substrate. The surfactant that can be used is not particularly limited as long as it satisfies the above limitation.

While any of an amphoteric surfactant, a non-ionic surfactant, or a cationic surfactant can be used, non-ionic surfactants such as polyoxyethylene alkyl phenyl ether, polyoxyethylene alkyl ester, polyoxyethylene alkylamine, polyoxyethylene alkyl amide, a polyoxyethylene propylene block polymer, sorbitan fatty acid ester, polyoxyethylene sorbitan fatty acid ester and an ethylene oxide adduct of acetylene alcohol are preferably used in terms of a relationship between dispersing stability and image quality. In addition, a fluorine-based surfactant and a silicon-based surfactant can be used in combination (or singly) depending on formulation.

Suitable surfactants are siloxane based surfactants such as Tego Twin 4000 from Evonik Industries, Tegowet 270 from Evonik industries, Hydropalat WE3220 from BASF, silane based surfactants such as Silwet HS312 from Momentive and fluor containing surfactants such as: Thetawet FS8150 from Neochem GMBH, Capstone FS3100 from Dupont, Tivida FL2500 from Merck and surfactants from the Dynol, Envirogem & Surfynol series from Evonik.

B.3. Additives

Together with the polyurethane resin, a multivalent metal ion can be contained in the treatment liquid. Suitable examples are water-soluble metal salts formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$), a nitrate ion ($NO_3^-$), and an acetate ion ($CH_3COO^-$).

These polyvalent metal ions have a function of aggregating ink by acting on anionic groups such as the carboxyl groups on the surface of the pigment or in the dispersing polymer of capsules contained in the ink. As a result, the ink remains on the surface of the substrate to improve the colour-developing property. Therefore, it is preferred that the surface of the pigment in the ink and/or the dispersed binder and/or latex contained in the ink have an anionic group selected from the group of carboxyl group, sulfonate group and phosphonate group, most preferably carboxyl group.

The treatment liquid may also contain organic acids. Preferred examples of the organic acids include, but are not limited to acetic acid, propionic acid, and lactic acid.

The treatment liquid may also contain colorants, such as pigments. Particularly useful for printing on dark colored substrates such as dark leather, textile or card board, is a treatment liquid containing a white pigment. The preferred pigment for the aqueous treatment liquid ink is titanium dioxide. Titanium dioxide ($TIO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully setforth.

The titanium dioxide particles can have a wide variety of average particle sizes of about 1 micron or less, depending on the desired end use application of the treatment liquid. For applications demanding high hiding or decorative printing applications, the titanium dioxide particles preferably have an average size of less than about 1 μm. Preferably, the particles have an average size of from about 50 to about 950 nm, more preferably from about 75 to about 750 nm, and still more preferably from about 100 to about 500 nm.

In addition, unique advantages may be realized with multiple particle sizes, such as opaqueness and UV protection. These multiple sizes can be achieved by adding both a pigmentary and a nano grade of $TIO_2$.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photoreactivity of the titanium dioxide. Metal oxide coatings of alumina, aluminasilica, boria and zirconia result in a positive charged surface of the $TiO_2$ pigments and hence are particularly useful in combination with the cationic stabilised polyurethanes of the invention because no additional surface treatment of the pigment is required.

Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan). Other suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are preferably of the rutile type. Commercially available products of rutile-type titanium oxide include Tipaque (registered trademark) CR-60-2, Tipaque CR-67, Tipaque R-980, Tipaque R-780, Tipaque R-850, Tipaque R-980, Tipaque R-630, Tipaque R-670, Tipaque PF-736 (each, product of Ishihara Sangyo Kaisha TRONOX CR 834 from Tronox Pigments BV.

C. Ink Set

The ink set according to the invention comprises the treatment liquid composition as described in § B. and an aqueous inkjet ink comprising a colorant.

The aqueous inkjet ink preferably comprises a solvent and a latex binder.

C.1. Solvent

The aqueous medium of the ink contains water, but may preferably include one or more water-soluble organic solvents. The one or more organic solvents may be added for a variety of reasons. For example, it can be advantageous to add a small amount of an organic solvent to improve the dissolution of a compound in the inkjet ink to be prepared. Preferable water-soluble organic solvents are polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-prapanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'-thiodiethanol, amides (e.g., N,N-dimethylformamide), heterocycles (e.g., 2-pyrrolidone and N-methyl-2-pyrrolidone), and acetonitrile.

C.2. Colorant

The colorants which can be included in the ink jet ink can be dyes or pigments.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments for use in the ink jet ink of the invention are disclosed in paragraphs [0128] to [0138] of WO 2008/074548. The pigment particles are dispersed in an aqueous medium using a polymeric dispersant, a (anionic) surfactant, but preferably a self-dispersible pigment is used. The latter prevents interaction of the polymeric dispersant with the dispersing groups of resin particles of the invention which may be included in the inkjet ink (see below), since dispersion stability of the pigment is accomplished by the same technique of electrostatic stabilization as employed for the resin particles.

A self-dispersible pigment is a pigment having on its surface covalently bonded anionic hydrophilic groups, such as salt-forming groups or the same groups used as dispersing groups for the resin particles, that allow the pigment to be dispersed in an aqueous medium without using a surfactant or a resin.

The technology for making self-dispersible pigments is well-known. For example, EP1220879A discloses pigments having attached a) at least one steric group and b) at least one organic ionic group and at least one amphiphilic counterion, wherein the amphiphilic counterion has a charge opposite to that of the organic ionic group that are suitable for inkjet inks. Also EP906371A discloses suitable surface-modified coloured pigment having attached hydrophilic organic groups containing one or more ionic groups or ionizable groups. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm.

However, for white pigment inkjet inks, the numeric average particle diameter of the white pigment is from about 50 to about 950 nm, more preferably from about 75 to about 750 nm, and still more preferably from about 100 to about 500 nm.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are the same as described in § B.3. Also special colorants may be used, such as fluorescent pigments for special effects in clothing, and metallic pigments for printing a luxury look of silver and gold colours on textiles.

Suitable polymeric dispersants for the pigments are copolymers of two monomers but they may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
  - alternating polymerized monomers (e.g. monomers A and B polymerized into ABABABAB);
  - gradient (tapered) polymerized monomers (e.g. monomers A and B polymerized into AAABAABBABBB);
  - block copolymers (e.g. monomers A and B polymerized into AAAAABBBBBB) wherein the block length of each of the blocks (2, 3, 4, 5 or even more) is important for the dispersion capability of the polymeric dispersant;
  - graft copolymers (graft copolymers consist of a polymeric backbone with polymeric side chains attached to the backbone); and
  - mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000. The polymeric dispersant has preferably a weight average molecular weight Mw smaller than 100,000, more preferably smaller than 50,000 and most preferably smaller than 30,000.

The pigments are preferably present in the range of 0.01 to 20%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

C.3. Latex Binder

The ink jet ink composition of the ink set according to the invention may further comprise a latex binder. The latex binder is often added to the ink jet ink formulation to achieve a good adhesion of the pigment to the substrate. The latex is a polymer and suitable latexes can be acrylic based latexes, urethane-modified polyester latexes, more preferably a urethane-modified polyester latex.

The polyurethane latex is to be incorporated in the ink formulation as a dispersion and may be selected from the group consisting of aliphatic polyurethane dispersions, aromatic polyurethane dispersions, anionic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, for example, or a combination of two or more of the above.

A preferred urethane latex to be used as dispersion in the ink of the invention is a polyester latex including a structural unit containing a urethane bond. Among such latexes, a water-soluble or water-dispersible urethane-modified polyester latex is preferred. It is preferable that the urethane-modified polyester latex include at least one structural unit derived from a hydroxyl group-containing polyester resin (polyester polyol) and at least one structural unit derived from an organic polyisocyanate.

A preferred polyurethane latex to be included in the ink of the invention is a polyurethane latex obtainable by reacting a polyester polyol, a polyether diol, a polyol containing an anionic group and a polyisocyanate. A particular preferred polyurethane latex is a polyurethane latex obtainable by reacting a polyester polyol, a polyether diol, a polyol containing an anionic group and a polyisocyanate, and wherein the polyester polyol is obtained by reacting an aromatic polycarboxylic acid and a polyol. Examples of suitable polyurethane latexes and their preparations are disclosed in the patent application WO2018/077624.

Some examples of suitable polyurethane latexes are NEOREZ R-989, NEOREZ R-2005, and NEOREZ R-4000 (DSM NeoResins); BAYHYDROL UH 2606, BAYHYDROL UH XP 2719, BAYHYDROL UH XP 2648, and BAYHYDROL UA XP 2631 (Bayer Material Science); DAOTAN VTW 1262/35WA, DAOTAN VTW 1265/36WA, DAOTAN VTW 1267/36WA, DAOTAN VTW 6421/42WA, DAOTAN VTW 6462/36WA (Cytec Engineered Materials Inc., Anaheim CA); and SANCURE 2715, SANCURE 20041, SANCURE 2725 (Lubrizol Corporation), for example, or a combination of two or more of the above.

Acrylic based latexes include polymers of acrylic monomers, polymers of methacrylic monomers, and copolymers of the aforementioned monomers with other monomers. These latexes are present as a suspension of particles having an average diameter of about 30 nm to about 300 nm. The acrylic latex polymer is formed from acrylic monomers or methacrylic monomer residues. Examples of monomers of the acrylic latex polymer include, by way of illustration, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene butadiene, p-chloromethylstyrene, divinyl benzene, vinyl naphthalene and divinylnaphthalene Some examples of suitable acrylic latex polymer suspensions are, JONCRYL 537 and JONCRYL 538 (BASF Corporation, Port Arthur TX); CARBOSET GA-2111, CARBOSET CR-728, CARBOSET CR-785, CARBOSET CR-761, CARBOSET CR-763, CARBOSET CR-765, CARBOSET CR-715, and CARBOSET GA-4028 (Lubrizol Corporation); NEOCRYL A-1110, NEOCRYL A-1131, NEOCRYL A-2091, NEOCRYL A-1127, NEOCRYL XK-96, and NEOCRYL XK-14 (DSM); and BAYHYDROL AH XP 2754, BAYHYDROL AH XP 2741, BAYHYDROL A 2427, and BAYHYDROL A2651 (Bayer), for example, or a combination of two or more of the above.

The concentration of the latex in the ink jet ink according to the invention is at least 1 wt. % and preferably lower than 30 wt. %, more preferably lower than 20 wt. %.

A.2.4. Additives

The aqueous inkjet ink may further comprise a surfactant, a humectant, a biocide, a film-forming agent and a thickener as an additive.

Humectants are preferably incorporated in the inkjet ink to prevent the clogging of nozzles. The prevention is due to its ability to slow down the evaporation rate of the solvents, especially of the water in the ink. The humectant is preferably an organic solvent having a higher boiling point than water. A preferred humectant is glycerol. The humectant is preferably added to the liquid formulation in an amount of 0.1 to 20 wt. % based on the total weight of the liquid.

A biocide may be added to the ink to prevent unwanted microbial growth, which may occur in the liquid. The biocide may be used either singly or in combination. Suitable biocides for the ink-jet ink of the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added to the aqueous medium in an amount of 0.001 to 3 wt. %, more preferably 0.01 to 1.0 wt. %, each based on the ink liquid.

D. Application Method of the Treatment Liquid

The treatment liquid according to the present invention is suitable for treating different substrates, porous and non-porous ones. Porous substrates include paper, card board, white lined chipboard, corrugated board, packaging board, wood, ceramics, stone, leather, synthetic leather and textile. Non-porous substrates include metal, synthetic leather, glass, polypropylene, polyvinylchloride, PET, PMMA, polycarbonate, polyamide, polystyrene or co-polymers thereof. The treatment liquid according to the present invention is particularly suitable for substrates having a low absorbability such as paper or leather having a coating on top of its surface. The treatment liquid according to the present invention is also suitable for treating jetted images, commonly known as post treatment fluid.

Specifically, for natural leather, a base coat is applied on crust leather (crust leather is obtained after tanning, drying and softening) to provide a quality commensurate to the luxury aspect of leather. The base coat may be applied as a single layer, or may be applied as multiple layers. The multiple layers may even have a different composition for improving properties like adhesion or flexibility.

The base coat preferably includes a polymer or copolymer based on polyurethane, as this has been found to improve flexibility to the leather.

Suitable polyurethanes include Urepal™ PU147 and PU181 from CHEMIPAL S.p.A.; Melio™ Promul 61 from STAHL; Astacin™ Finish PS from BASF; Ecrothan™ 4075, 4078 and 4084 from MICHELMAN; Incorez™ CS8073 and CS065-195 from INCOREZ. The dry weight of the polyurethane in the base coat is preferably in the range of 1 to 6 $g/m^2$.

Although polyurethanes are preferred as the polymers for the base coat, other polymers may be used preferably in combination with the polyurethanes. Such polymers preferably have an elongation at break of more than 200%, more preferably 300%. The elongation at break is measured according to ISO527-2, for example, with a MTS Exceed™ testing apparatus from MTS Systems Corporation.

Another type of preferred polymers to be used in the base coat are polyacrylates. Polyacrylates provide good flexibility and stabilize pigment dispersions in the base coat.

In a preferred embodiment, the base coat preferably includes a polymer or copolymer based on polyurethane and polymer or copolymer based on a polyacrylate. Such a combination brings excellent flexibility even in the presence of pigments.

Preferred polyacrylates are Roda™ Base 5514 from TFL and Primal™ HPB980 from LANXESS. A suitable polymeric acrylate emulsion is Bioflex™ KGA from LMF Biokimica.

A cross-linker may be incorporated in the base coat to improve the strength of the base coat and the adhesion to crust leather. Preferred cross-linkers include aldehyde based cross-linkers such as formaldehyde, melamine formaldehyde derivatives, urea formaldehyde resins, glyoxal and glutaraldehyde, epoxides, oxazolines, carbodiimides and isocyanates, isocyanates being particularly preferred. The dry weight of the cross-linker in the base coat is preferably less than 1.4 $g/m^2$, more preferably less than 1.0 $g/m^2$.

The base coat is preferably applied by spraying, but may be applied by any coating technique known, such as knife coating, extrusion coating, slide hopper coating and curtain coating.

The base coat preferably has a colour similar to that of the corium and the grain. Any desired colour may be chosen for the corium or grain and the base coat, such as red, green, brown, black, blue . . . .

All well-known conventional methods can be used for coating or impregnating the treatment liquid according to the invention on a substrate or on an image formed by jetting an aqueous inkjet ink. Examples of the method include air knife coating, blade coating, roll coating, gravure coating and jetting techniques such as inkjet, valve jet and spraying. After applying the treatment liquid onto a substrate, the coating is preferably dried before printing the image onto the treated substrate.

The treatment liquid is particularly suitable for treating non-porous or low absorbing substrates, before or after printing images with inkjet printing.

The treatment liquid is also suitable for treating textile fabrics. The textile fabric used is made of one type of fibre or blended fibre of two or more selected from the group consisting of cotton, hemp, rayon fibre, acetate fibre, silk, nylon fibre, and polyester fibre. The fabric may be in any form, for example, a woven, knitted, or nonwoven form of the above-mentioned fibres. The treatment liquid containing the polyurethane resin according to the invention can be preferably applied to the fabric by spraying, coating, padding or pad printing. Alternatively, the pre-treatment liquid may also be applied to the fabric using an ink jet head or valve jet head. This means of applying the treatment liquid has the advantage that the amount of required treatment liquid is substantially lower than with the other application methods. By means of a jetting head, it is possible to apply treatment liquid onto areas of the fabric where the image should be printed. Suitable ink jet head types for applying the treatment liquid are piezoelectric type, continuous type, thermal print head type or valve jet type.

Fabric to which the treatment liquid has been applied may be dried and optionally undergo a heat treatment, before the subsequent ink jetting step with the pigment containing ink. Examples of the heating process include, but are not limited to, heat press, atmospheric steaming, high-pressure steaming, and THERMOFIX. Any heat source can be used for the heating process; for example, an infrared ray lamp is employed.

In another preferred embodiment of the invention, the treatment liquid, after having been applied onto a substrate, is not substantially dried before the image is printed by means of the jetting of the aqueous ink jet ink.

E. Examples

E.1. Measurement Methods

E.1.1. Color Measurement

The reflectance spectrum of each sample was measured two times (then averaged) with a X-Rite™ eXact spectrophotometer in the range from 400 up to 700 nm in steps of 10 nm. The CIEL*a*b* coordinates were determined for a 2° observer and a D50 light source.

The chroma is defined by the Commission Internationale de l'Eclairage (CIE) as the colorfulness of an area judged as a proportion of the brightness of a similarly illuminated area that appears white or highly transmitting (http://eilv.cie.co.at/). The higher the chroma, the more colorful compared to a grey (or white) of the same lightness. According to CIE 15 Technical report: Colorimetry, 3rd edition: 2004, the chroma can be calculated as follow: CIE 1976 a, b (CIELAB)chroma:

$$C^*_{ab} = \left(a^{*2} + b^{*2}\right)^{1/2}.$$

The saturation usually expresses how much the chroma participates in the total color impression. The perceived saturation $S_{ab}$ as defined according to the following formula by Eva Lübbe (ISBN 978-3-7881-4057-1) depends both on the chroma $C_{ab}$* and the lightness L* of an object and could quantify the colorfulness of an object:

$$S_{ab} = \frac{C^*_{ab}}{\left(C^{*2}_{ab} + L^{*2}\right)^{1/2}} 100\%.$$

The color difference between two colors 1 and 2, is determined according to the CIE76 color difference formula and is defined as:

$$\Delta E_{ab} = \sqrt{(L^*_1 - L^*_2)^2 + (a^*_1 - a^*_2)^2 + (b^*_1 - b^*_2)^2}.$$

A value for ΔE≈2.3 corresponds to a JND (just noticeable difference), as explained in Sharma, Gaurav (2003). Digital Color Imaging Handbook (1.7.2 ed.). CRC Press. ISBN 0-8493-0900-X.

E.1.2. Average Particle Size

The average particle size of the PU-dispersions was measured by means of a Zetasizer™ Nano-S (Malvern Instruments, Goffin Meyvis).

D.2. Materials

All materials used in the following examples were readily available from standard sources such as Sigma-Aldrich (Belgium) and Acros (Belgium) unless otherwise specified. The water used was demineralised water.

Acetone is acetone p.a. supplied by VWR International

Ymer N120 is 1,3 diol polyether supplied by Perstorp

Dynacol 7150 is a polyester diol and is supplied by Evonik

Reaxis C708, catalyst supplied by Reaxis BV, The Netherlands

IPDI is an isocyanate supplied by Covestro as Desmodur I

Desmodur XP2565 is an allophanate based isocyanate according to general formula I and is an oligomerisation product of 3-isocyanatomethyl-3,5,5-trimethylcyclohexyl isocyanate and butan-1-ol and pentan-1-ol and 2-ethylhexan-1-ol, supplied by Covestro Tolonate X FLO100 is an allophanate based isocyanate according to general formula I and is supplied by Vencorex Chemicals BD is 1,4-butane diol supplied by Acros Disperbyk-190 is a 40 wt. % solution of dispersing agent supplied by BYK CHEMIE GMBH COL is a commercial cyan dispersion supplied by Cabot Corporation, available under the trade name Cab-O-Jet 450C Tronox CR-843 is a titanium dioxide pigment from Tronox Pigments BV PYR is 2-pyrrolidone HD is 1,2-hexanediol Proxel K is an aqueous solution of 5-10% 1,2-Benzisothiazolin-3-one SURF-1 is Capstone FS3100, a surfactant from Dupont SURF-2 is Tego Wet 270, a surfactant from Evonik Industries OPV is a 5 wt. % aqueous solution of 1,2-benzisothiazoline-3-one potassium salt (CASRN 127553-58-6, commercially available from Prom Chem)

DISP is a concentrated white pigment dispersion and is prepared as follows: 275.00 g of white pigment Tronox CR-834, 68.75 g of dispersant DISPERBYK-190 and 2.20 g of biocide OPV were mixed into 204.05 g of water using a DISPERLUX™ dispenser. Stirring was continued for 30 minutes. The vessel was connected to a DynoMill-RL mill filled with 200 g of 0.4 mm yttrium stabilized zirconia beads ("high wear resistant zirconia grinding media" from TOSOH Co.). The mixture was circulated over the mill for 75 minutes (residence time of 10 minutes) with a rotation speed of 4500 t/min. During the complete milling procedure, the content in the mill was cooled to keep the temperature below 60° C. After milling, the dispersion was discharged into a vessel.

N,N-bis(2-hydroxyethyl)-N-methyl-benzenemethanaminium, bromide (1:1) has been synthesized by reaction of benzyl bromide with N-methyliminodiethanol as follows: In a 250 mL three-necked round-bottom flask 5.96 g of N-methyliminodiethanol was dissolved in 50 mL of anhydrous acetonitrile placed in an ice cooling bath under a continuous flow of nitrogen. A solution of 8.99 g of benzyl bromide in 50 mL of acetonitrile was added dropwise to the reaction solution via an addition funnel. The reaction solution was stirred at ambient temperature during 16 hours. Upon completion the reaction mixture was washed with a mixture of n-hexane and dichloromethane in a ratio of 1:1 and filtered. The residue was dried over 48 hours in an oven at 40° C. under reduced pressure to obtain a desired product in 96% yield (13.92 g, white solid).

Benzoxonium chloride: Dodecyl(benzyl)diethanolammonium chloride provided by Sachem under the tradename BEXOC.

PU-9 dispersion is a reproduction of the PU-9 dispersion disclosed in the published patent application: WO2018/077624 having a solid content of 41.9 wt. %

E.3. Preparation of the Polyurethane Resin Dispersions

PU-1 (COMP)

In an Erlenmeyer of 500 mL 95.11 g of Dynacoll 7150 (supplied by Evonik) and 94.92 g of acetone were weighed. The solution of Dynacoll 7150 in acetone was vigorously stirred at room temperature during 60 minutes by using a magnetic stirrer to obtain a colorless and clear solution. The poly ether diol, Ymer N120, was preheated in an oven at 80° C. to obtain a liquid product. 13.96 g of Ymer N120 was added to the solution and stirred during 15 minutes by using a magnetic stirrer to obtain a polyol mixture which was further used in the reaction. In a 500 mL three-necked round-bottom flask equipped with a coiled condenser and an overhead stirrer, 14.89 g of N,N-bis(2-hydroxyethyl)-N-methyl-benzenemethanaminium bromide was dissolved in 70.74 g of acetonitrile placed in an oil bath at 65° C. under a continuous flow of nitrogen during 30 minutes. While the cationic diol dissolved in acetonitrile the mixture of Dynacoll and Ymer was added dropwise to the reaction solution via an addition funnel. The reaction solution was slightly turbid in the beginning and became clear while adding the polyol mixture at 65° C. during 30 minutes. After the addition of the polyols the funnel was flushed with 19.78 g of acetone. A solution of 1.07 g of Reaxis in 11.87 g of acetone was further added to the reaction mixture. Subsequently 34.21 g of IPDI was added dropwise via an addition funnel with pressure equalization arm during 20 minutes. The amount of isocyanate is in excess towards the hydroxyl amount, ie. NCO/OH=1.53. After adding IDPI the addition funnel was flushed with 3.93 g (5 ml) of acetonitrile, and the reaction mixture was stirred at 65° C. during 2 hours. Subsequently a solution of 4.80 g of BD in 5 ml of acetonitrile was added. The reaction mixture was reacted over 20 hours at 55° C. and then heated at 65° C. during 1 hour in order to reach full conversion.

338.5 g (43.11% solids) of the reaction mixture was weighed in a stainless steel. Subsequently the water based dispersion was made by using Disperlux equipment through adding water during high shear mixing. Under stirring at 900 RPM using a 9 cm diameter dissolver stirrer 270.98 g of water was added to the PU solution during 20 minutes. The emulsion was further stirred during 30 minutes under stirring at 900 RPM to obtained 545.9 g of a viscous dispersion. Subsequently 386.2 g of a viscous dispersion was obtained after the removal of acetonitrile and acetone from the emulsion at 40° C. by rotary vacuum evaporation under reduced pressure. The evaporation started at a pressure of 400 mbar and the pressure was gradually decreased till 60 mbar. 30.7 g of demineralized water was added to the viscous dispersion to obtain a 35 wt. % dispersion. The solids content was measured of the resulting dispersion, ie. 39.84 wt %, The pH of the obtained dispersion is 5.32. The average particle size is 166.7 nm.

PU-2 (COMP)

In an Erlenmeyer of 500 mL 103.88 g of Dynacoll 7150 and 94.92 g of acetone were weighed. The solution of Dynacoll 7150 in acetone was vigorously stirred at room temperature during 60 minutes by using a magnetic stirrer to obtain a colorless and clear solution. The poly ether diol, Ymer N120, was preheated in an oven at 80° C. to obtain a liquid product. 15.25 g of Ymer N120 was added to the solution and stirred during 15 minutes by using a magnetic stirrer to obtain a polyol mixture which was further used in the reaction. In a 500 mL three-necked round-bottom flask equipped with a coiled condenser and an overhead stirrer, 11.20 g of benzoxonium chloride was dissolved in 86.46 g of acetonitrile placed in an oil bath at 65° C. under a continuous flow of nitrogen during 30 minutes. While the cationic diol dissolved in acetonitrile the mixture of Dynacoll and Ymer was added dropwise to the reaction solution via an addition funnel. The reaction solution was slightly turbid in the beginning and became clear while adding the polyol mixture at 65° C. during 30 minutes. After the addition of the polyols, the funnel was flushed with 15.82 g of acetone. A solution of 1.07 g of Reaxis C708 in 7.91 g of acetone was further added to the reaction mixture. Subsequently 125.2 mmol IPDI was added dropwise via an addition funnel with pressure equalization arm during 20 minutes. The amount of isocyanate is in excess towards the hydroxyl amount, ie. NCO/OH=1.53. After adding IDPI the addition funnel was flushed with 7.91 g of acetone, and the reaction mixture was stirred at 65° C. during 2 hours. Subsequently a solution of 3.91 g of BD in 3.92 g of acetone was added. The reaction mixture was reacted over 20 hours at 55° C. and then heated at 65° C. during 1 hour in order to reach full conversion.

352.50 g (42.97% solids) of the reaction mixture was weighed in a stainless steel. Subsequently the water based dispersion was made by using Disperlux equipment through adding water during high shear mixing. Under stirring at 900 RPM using a 9 cm diameter dissolver stirrer 281.31 g of water was added to the PU solution during 20 minutes. The emulsion was further stirred during 30 minutes under stirring at 900 RPM to obtain 548.00 g of a viscous dispersion. Subsequently 409.20 g of a viscous dispersion was obtained after the removal of acetonitrile and acetone from the emulsion at 40° C. by rotary vacuum evaporation under reduced pressure. The evaporation started at a pressure of 400 mbar and the pressure was gradually decreased till 60 mbar. 23.60 g of demineralized water was added to the viscous dispersion to obtain a 35 wt. % dispersion. The solids content was measured of the resulting dispersion, ie. 36.20 wt %, The pH of the obtained dispersion is 5.58. The average particle size is 34.8 nm.

PU-3 (COMP)

In an Erlenmeyer of 500 mL 102.03 g of Dynacoll 7150 and 94.92 g of acetone were weighed. The solution of Dynacoll 7150 in acetone was vigorously stirred at room temperature during 60 minutes by using a magnetic stirrer to obtain a colorless and clear solution. The poly ether diol, Ymer N120, was preheated in an oven at 80° C. to obtain a liquid product. 14.98 g of Ymer N120 was added to the solution and stirred during 15 minutes by using a magnetic stirrer to obtain a polyol mixture which was further used in the reaction. In a 500 mL three-necked round-bottom flask equipped with a coiled condenser and an overhead stirrer, 15.97 g of N,N-bis(2-hydroxyethyl)-N-methyl-benzenemethanaminium bromide was dissolved in 70.74 g of acetonitrile placed in an oil bath at 65° C. under a continuous flow of nitrogen during 30 minutes. While the cationic diol dissolved in acetonitrile the mixture of Dynacoll and Ymer was added dropwise to the reaction solution via an addition funnel. The reaction solution was slightly turbid in the beginning and became clear while adding the polyol mixture at 65° C. during 30 minutes. After the addition of the polyols, the funnel was flushed with 19.78 g of acetone. A solution of 1.07 g of Reaxis C708 in 11.87 g of acetone was further added to the reaction mixture. Subsequently 25.19 g of IPDI was added dropwise via an addition funnel with pressure equalization arm during 20 minutes. The amount of isocyanate is in excess towards the hydroxyl amount, ie.

NCO/OH=1.05. After adding IPDI the addition funnel was flushed with 5 ml of acetonitrile, and the reaction mixture was stirred at 65° C. during 2 hours. Subsequently a solution of 0.49 g of BD in 5 ml of acetonitrile was added. The reaction mixture was reacted over 20 hours at 55° C. and then heated at 65° C. during 1 hour in order to reach full conversion.

341.5 g (42.45% solids) of the reaction mixture was weighed in a stainless steel. Subsequently the water based dispersion was made by using Disperlux equipment through adding water during high shear mixing. Under stirring at 900 RPM using a 9 cm diameter dissolver stirrer 269.24 g of water was added to the PU solution during 20 minutes. The emulsion was further stirred during 30 minutes under stirring at 900 RPM to obtain 557.2 g of a viscous dispersion. Subsequently 380.3 g of a viscous dispersion was obtained after the removal of acetonitrile and acetone from the emulsion at 40° C. by rotary vacuum evaporation under reduced pressure. The evaporation started at a pressure of 400 mbar and the pressure was decreased gradually till 60 mbar. 33.9 g of demineralized water was added to the viscous dispersion to obtain a 35 wt. % dispersion. The solids content was measured of the resulting dispersion, ie. 38.63 wt %, The pH of the obtained dispersion is 5.50. The average particle size is 62.16 nm.

PU-4 (INV)

In an Erlenmeyer of 500 mL 61.04 g of Dynacoll 7150 and 87.01 g of acetone were weighed. The solution of Dynacoll 7150 in acetone was vigorously stirred at room temperature during 60 minutes by using a magnetic stirrer to obtain a colorless and clear solution. The poly ether diol, Ymer N120, was preheated in an oven at 80° C. to obtain a liquid product. 8.96 g of Ymer N120 was added to the solution and stirred during 15 minutes by using a magnetic stirrer to obtain a polyol mixture which was further used in the reaction. In a 500 mL three-necked round-bottom flask equipped with a coiled condenser and an overhead stirrer, 9.56 g of N,N-bis(2-hydroxyethyl)-N-methyl-benzenemethanaminium bromide was dissolved in 70.74 g of acetonitrile placed in an oil bath at 65° C. under a continuous flow of nitrogen during 30 minutes. While the cationic diol dissolved in acetonitrile the mixture of Dynacoll and Ymer was added dropwise to the reaction solution via an addition funnel. The reaction solution was slightly turbid in the beginning and became clear while adding the polyol mixture at 65° C. during 30 minutes. After the addition of the polyols the funnel was flushed with 19.78 g of acetone. A solution of 1.01 g of Reaxis C708 in 9.4 g of acetone was further added to the reaction mixture. Subsequently 69.14 g of Desmodur XP 2565 was added dropwise via an addition funnel with pressure equalization arm during 20 minutes. The amount of isocyanate is in excess towards the hydroxyl amount, ie. NCO/OH=1.53. After adding Desmodur XP 2565, the addition funnel was flushed with 7.86 g of acetonitrile and the reaction mixture was stirred at 65° C. during 2 hours. Subsequently a solution of 3.08 g of BD in 5 ml of acetonitrile was added. The reaction mixture was reacted over 4 hours at 55° C. in order to reach full conversion.

325.11 g (41.37% solids) of the reaction mixture was weighed in a stainless steel. Subsequently the water based dispersion was made by using Disperlux equipment through adding water during high shear mixing. Under stirring at 900 RPM using a 9 cm diameter dissolver stirrer 249.79 g of water was added to the PU solution during 20 minutes. The emulsion was further stirred during 30 minutes under stirring at 900 RPM to obtain 506 g of a viscous dispersion. Subsequently 384.29 g of a viscous dispersion was obtained after the removal of acetonitrile and acetone from the emulsion at 40° C. by rotary vacuum evaporation under reduced pressure. The evaporation started at a pressure of 400 mbar and the pressure was decreased gradually till 60 mbar. 51.8 g of demineralized water was added to the viscous dispersion to obtain a 35 wt. % dispersion. The solids content was measured of the resulting dispersion, ie. 33.69 wt. %, The pH of the obtained dispersion is 6.32. The average particle size is 27.7 nm.

PU-5 (INV)

In an Erlenmeyer of 500 mL 74.12 g of Dynacoll 7150 and 94.92 g of acetone were weighed. The solution of Dynacoll 7150 in acetone was vigorously stirred at room temperature during 60 minutes by using a magnetic stirrer to obtain a colorless and clear solution. The poly ether diol, Ymer N120, was preheated in an oven at 80° C. to obtain a liquid product. 10.88 g of Ymer N120 was added to the solution and stirred during 15 minutes by using a magnetic stirrer to obtain a polyol mixture which was further used in the reaction. In a 500 mL three-necked round-bottom flask equipped with a coiled condenser and an overhead stirrer, 7.99 g of benzoxonium chloride was dissolved in 70.74 g of acetonitrile placed in an oil bath at 65° C. under a continuous flow of nitrogen during 30 minutes. While the cationic diol dissolved in acetonitrile the mixture of Dynacoll and Ymer was added dropwise to the reaction solution via an addition funnel. The reaction solution was slightly turbid in the beginning and became clear while adding the polyol mixture at 65° C. during 30 minutes. After the addition of the polyols the funnel was flushed with 19.78 g of acetone. A solution of 1.06 g of Reaxis C708 in 11.87 g of acetone was further added to the reaction mixture. Subsequently 62.55 g of Desmodur XP2565 was added dropwise via an addition funnel with pressure equalization arm during 20 minutes. The amount of isocyanate is in excess towards the hydroxyl amount, ie. NCO/OH=1.53. After adding Desmodur XP2565 the addition funnel was flushed with 7.86 g of acetonitrile, and the reaction mixture was stirred at 65° C. during 2 hours. Subsequently a solution of 2.79 g of 1,4-butane diol in 5 ml of acetonitrile was added. The reaction mixture was reacted over 4 hours at 55° C. in order to reach full conversion.

344.0 g (42.40% solids) of the reaction mixture was weighed in a stainless steel. Subsequently the water based dispersion was made by using Disperlux equipment through adding water during high shear mixing. Under stirring at 900 RPM using a 9 cm diameter dissolver stirrer 270.88 g of water was added to the PU solution during 20 minutes. The emulsion was further stirred during 30 minutes under stirring at 900 RPM to obtain 544.00 g of a viscous dispersion. Subsequently 388 g of a viscous dispersion was obtained after the removal of acetonitrile and acetone from the emulsion at 40° C. by rotary vacuum evaporation under reduced pressure. The evaporation started at a pressure of 400 mbar and the pressure was decreased gradually till 60 mbar. 28.7 g of demineralized water was added to the viscous dispersion to obtain a 35 wt. % dispersion. The solids content was measured of the resulting dispersion, ie. 32.18 wt. %, The pH of the obtained dispersion is 5.62. The average particle size is 19.35 nm.

PU-6 (INV)

In an Erlenmeyer of 500 mL 79.80 g of Dynacoll 7150 and 98.08 g of acetone were weighed. The solution of Dynacoll 7150 in acetone was vigorously stirred at room temperature during 60 minutes by using a magnetic stirrer to obtain a colorless and clear solution. The poly ether diol, Ymer N120, was preheated in an oven at 80° C. to obtain a liquid product. 11.71 g of Ymer N120 was added to the solution and stirred during 15 minutes by using a magnetic stirrer to obtain a polyol mixture which was further used in the reaction. In a 500 mL three-necked round-bottom flask equipped with a coiled condenser and an overhead stirrer, 12.49 g of N,N-bis(2-hydroxyethyl)-N-methyl-benzen-emethanaminium bromide was dissolved in 78.60 g of acetonitrile placed in an oil bath at 65° C. under a continuous flow of nitrogen during 30 minutes. While the cationic diol dissolved in acetonitrile the mixture of Dynacoll and Ymer was added dropwise to the reaction solution via an addition funnel. The reaction solution was slightly turbid in the beginning and became clear while adding the polyol mixture at 65° C. during 30 minutes. After the addition of the polyols, the funnel was flushed with 19.78 g of acetone. A solution of 1.09 g of Reaxis C708 in 11.87 g of acetone was further added to the reaction mixture. Subsequently 57.25 g of Tolonate X FLO100 was added dropwise via an addition funnel with pressure equalization arm during 20 minutes. The amount of isocyanate is in excess towards the hydroxyl amount, ie. NCO/OH=1.05. After adding Tolonate X FLO100 the addition funnel was flushed with 3.93 g of acetonitrile and the reaction mixture was stirred at 65° C. during 2 hours. Subsequently a solution of 0.38 g of BD in 5 ml of acetonitrile was added. The reaction mixture was reacted over 20 hours at 55° C. in order to reach full conversion.

353.7 g (42.91% solids) of the reaction mixture was weighed in a stainless steel. Subsequently the water based dispersion was made by using Disperlux equipment through adding water during high shear mixing. Under stirring at 900 RPM using a 9 cm diameter dissolver stirrer 281.86 g of water was added to the PU solution during 20 minutes. The emulsion was further stirred during 30 minutes under stirring at 900 RPM to obtained 506 g of a viscous dispersion. Subsequently 387.90 g of a viscous dispersion was obtained after the removal of acetonitrile and acetone from the emulsion at 40° C. by rotary vacuum evaporation under reduced pressure. The evaporation started at a pressure of 400 mbar and the pressure was decreased gradually till 60 mbar. 45.7 g of demineralized water was added to the viscous dispersion to obtain a 35 wt. % dispersion. The solids content was measured of the resulting dispersion, ie. 38.62 wt. %, The pH of the obtained dispersion is 5.73. The average particle size is 46.90 nm.

Example 1

This example illustrates the increase in chroma and color saturation of an image obtained by applying an aqueous inkjet ink onto a leather substrate when treated with an aqueous pre-treatment liquid comprising the polyurethane dispersion based on Desmodur XP as allophanate based isocyanate and having quaternary ammonium groups carrying a methyl group onto the N-atom.

Preparation of Treatment Liquids

Treatments liquids PTL-1 and PTL-2 were prepared by mixing the compounds given in Table 1. All weight percentages are relative to the total weight of the treatment liquid.

TABLE 1

| Compound | PTL-1 (COMP) Content in wt. % | PTL-2 (INV) Content in wt. % |
|---|---|---|
| PU-1(COMP) | 30.1 | |
| PU-4 (INV) | | 35.7 |

TABLE 1-continued

| Compound | PTL-1 (COMP) Content in wt. % | PTL-2 (INV) Content in wt. % |
|---|---|---|
| DISP | 22.0 | 22.0 |
| SURF-1 | 0.8 | 0.8 |
| HD | 15.0 | 15.0 |
| PYR | 15.0 | 15.0 |
| Water | To complete to 100% | To complete to 100% |

Preparation of the INK-1

An aqueous cyan ink INK-1 was prepared by mixing the compounds given in Table 2. All weight percentages are relative to the total weight of the ink.

TABLE 2

| Compound | INK-1 Content in wt. % |
|---|---|
| PU-9 dispersion | 28.64 |
| SURF-2 | 0.60 |
| water | 10.76 |
| PYR | 20.00 |
| HD | 20.00 |
| COL | 20.00 |
| Water | To complete to 100% |

Evaluation and Results

The treatment liquids PTL-1 and PTL-2 were coated by using a 20 μm spiral bar (from Elcometer) with a motorized film applicator Elcometer 4340 on a sheet of black dyed crusted bovine leather supplied from Conceria Nuti Ivo S.P.A. (Italy) coated with a polyurethane based black pigmented layer. After drying the coated layer of treatment liquid at 60° C. in an oven for 5 minutes, the treated substrate sheets were coated with INK-1 by means of a 10 μm spiral bar. The coated samples were dried at 60° C. for 6 minutes.

The reflectance spectrum of each sample was measured according to § E.1.1. The results are depicted in Table 3.

TABLE 3

| | L* | a* | b* | $C_{ab}$* | $S_{ab}$ |
|---|---|---|---|---|---|
| PTL-1 (COMP) | 27.35 | −6.00 | −30.33 | 30.92 | 74.91 |
| PTL-2 (INV) | 32.41 | −14.26 | −40.15 | 42.61 | 79.59 |

From Table 3, it can be seen that the sample made with the set of liquids according to the invention (PTL-2+INK-1) is more colorful (higher chroma) and more saturated than with a set of liquids not according to the invention (PTL-1+INK-1). In addition, the $\Delta E_{ab}$ of 13.79, calculated according to CIE76 shows that the colors are visually different.

Example 2

This example illustrates the increase in chroma and color saturation of an image obtained by applying an aqueous inkjet ink onto a leather substrate when treated with an aqueous pre-treatment liquid comprising the polyurethane dispersion based on Desmodur XP as allophanate based isocyanate and having a long chain alkyl group onto the N-atom.

Preparation of Treatment Liquids

Treatments liquids PTL-3 and PTL-4 were prepared by mixing the compounds given in Table 4. All weight percentages are relative to the total weight of the treatment liquid.

TABLE 4

| Compound | PTL-3 (COMP) Content in wt. % | PTL-4 (INV) Content in wt. % |
|---|---|---|
| PU-2 (COMP) | 33.2 | |
| PU-5 (INV) | | 37.3 |
| DISP | 22.0 | 22.0 |
| SURF-1 | 0.8 | 0.8 |
| HD | 15.0 | 15.0 |
| PYR | 15.0 | 15.0 |
| Water | To complete to 100% | To complete to 100% |

Evaluation and Results

The treatment liquids PTL-3 and PTL-4 together with the ink INK-1 were applied in a similar manner as PTL-1, PTL-2 and INK-1 in Example 1.

The reflectance spectrum of each sample was measured in a similar manner as in Example 1. The results are depicted in Table 5.

TABLE 5

| | L* | a* | b* | $C_{ab}$* | $S_{ab}$ |
|---|---|---|---|---|---|
| PTL-3 (COMP) | 28.04 | −7.39 | −31.37 | 32.23 | 75.44 |
| PTL-4 (INV) | 30.30 | −13.98 | −38.82 | 41.26 | 80.60 |

From Table 5, it can be seen that the sample made with the set of liquids according to the invention (PTL-4+INK-1) is more colorful (higher chroma) and more saturated than with a set of liquids not according to the invention (PTL-3+INK-1). In addition, the $\Delta E_{ab}$ of 10.20 shows that the colors are visually different.

Example 3

This example illustrates the increase in chroma and color saturation of an image obtained by applying an aqueous inkjet ink onto a leather substrate when treated with an aqueous pre-treatment liquid comprising the polyurethane dispersion based on a Tolonate X FLO100 as allophanate based isocyanate and quaternary ammonium groups with a methyl group as alkyl group on the N-atom.

Preparation of the Treatment Liquids PTL-5 and PTL-6

Treatment liquids PTL-5 and PTL-6 were prepared by mixing the compounds given in Table 6. All weight percentages are relative to the total weight of the treatment liquid.

TABLE 6

| Compound | PTL-5 (COMP) Content in wt. % | PTL-6 (INV) Content in wt. % |
|---|---|---|
| PU-3 (COMP) | 31.1 | |
| PU-6 (INV) | | 31.1 |
| DISP | 22.0 | 22.0 |
| SURF-1 | 0.8 | 0.8 |
| HD | 15.0 | 15.0 |
| PYR | 15.0 | 15.0 |
| Water | To complete to 100% | To complete to 100% |

Evaluation and Results

The treatment liquids PTL-5 and PTL-6 together with the ink INK-1 were applied in a similar manner as PTL-1, PTL-2 and INK-1 in Example 1.

The reflectance spectrum of each sample was measured in a similar manner as in Example 1. The results are depicted in Table 7.

TABLE 7

| | L* | a* | b* | $C_{ab}$* | $S_{ab}$ |
|---|---|---|---|---|---|
| PTL-5 (COMP) | 28.35 | −8.18 | −34.35 | 35.31 | 77.98 |
| PTL-6 (INV) | 31.47 | −11.42 | −37.54 | 39.24 | 78.01 |

From Table 7, it can be seen that the sample made with the set of liquids according to the invention (PTL-6+INK-1) is more colorful (higher chroma) and more saturated than with a set of liquids not according to the invention (PTL-5+INK-1). In addition, the $\Delta E_{ab}$ of 5.52 shows that the colors are visually different.

The invention claimed is:

1. An aqueous polyurethane resin dispersion, wherein the polyurethane resin is obtainable by reacting a polyether diol, a polyol containing a quaternary N-atom or tertiary amino group, a polyol selected from the group consisting of polyester polyol, polycarbonate polyol, a polyacrylate polyol, a polyolefin, and a polyamide polyol, and an allophanate-based isocyanate of formula I or formula II:

formula I

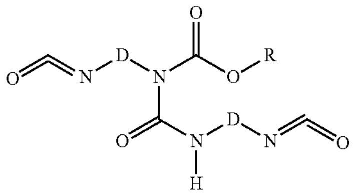

formula II

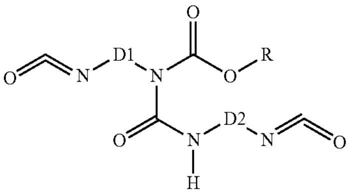

wherein

D, D1, and D2 are each independently of formula III, IV or V:

formula III

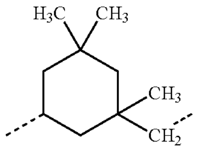

formula IV

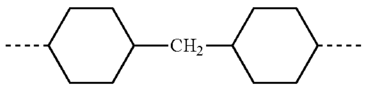

formula V

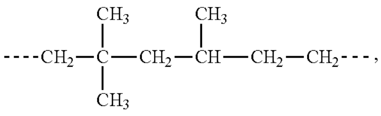

, and

R is a substituted or unsubstituted alkyl group, a substituted or unsubstituted alkenyl group, a substituted or unsubstituted alkynyl group, a substituted or unsubstituted cycloaliphatic group, a substituted or unsubstituted alkylaryl group, or a substituted or unsubstituted aryl or heteroaryl group.

2. The aqueous polyurethane resin dispersion of claim 1, wherein the polyol is a polyester polyol obtained by reacting an aromatic polycarboxylic acid and a polyol, and wherein the polyether diol is of formula X:

formula X

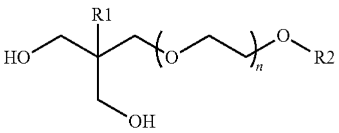

wherein R1 is methyl or ethyl, R2 is $C_1$-$C_4$ alkyl, and n represents an integer from 5 to 50.

3. The aqueous polyurethane resin dispersion of claim 1, wherein the tertiary amino group in the resin is protonated.

4. The aqueous polyurethane resin dispersion of claim 2, wherein the aromatic polycarboxylic acid is selected from the group consisting of phthalic acid, terephthalic acid, and isophthalic acid.

5. The aqueous polyurethane resin dispersion of claim 1, wherein the polyether diol is α-[2,2-bis(hydroxymethyl) butyl]-ω-methoxy-poly(oxy-1,2-ethanediyl).

6. The aqueous polyurethane resin dispersion of claim 1, wherein the allophanate-based isocyanate contains a cycloaliphatic group.

7. The aqueous polyurethane resin dispersion of claim 1, wherein the polyol containing a quaternary N-atom or tertiary amino group is N,N'-dihydroxyethyl-p-toluidine, 2,2'-(methylimino)diethanol), 3-(dimethylamino)-1,2-propanediol, N,N-bis(2-hydroxyethyl)-N-methyl-benzenemethanaminium, N-decyl-N,N-bis(2-hydroxyethyl)-benzenemethanaminium, N,N-bis(2-hydroxyethyl)-N-tridecylbenzenemethanaminium, N-dodecyl-N,N-bis(2-hydroxyethyl)benzenemethanaminium, or α,α'-[(dodecylmethyliminio)di-2,1-ethanediyl]bis[ω-hydroxy poly(oxy-1,2-ethanediyl).

8. An aqueous treatment liquid for ink jet printing comprising the polyurethane resin of claim 1.

9. The aqueous treatment liquid for ink jet printing of claim 8, wherein the liquid further comprises a pigment.

10. An ink set for inkjet printing comprising the aqueous treatment liquid of claim 8 and an aqueous ink comprising a colorant.

11. An inkjet recording method, comprising the following steps:

(i) providing a substrate;

(ii) applying the treatment liquid of claim 8 on a surface of the substrate, optionally drying the applied treatment liquid; and (iii) printing an image by jetting an aqueous ink jet ink onto the applied treatment liquid.

12. An aqueous treatment liquid for ink jet printing comprising the polyurethane resin of claim 5.

13. The aqueous treatment liquid for ink jet printing of claim 12, wherein the liquid further comprises a pigment.

14. An ink set for inkjet printing comprising the aqueous treatment liquid of claim 12 and an aqueous ink comprising a colorant.

15. An inkjet recording method, comprising the following steps:

(i) providing a substrate;

(ii) applying the treatment liquid of claim 12 on a surface of the substrate, optionally drying the applied treatment liquid; and (iii) printing an image by jetting an aqueous ink jet ink onto the applied treatment liquid.

16. An aqueous treatment liquid for ink jet printing comprising the polyurethane resin of claim 7.

17. The aqueous treatment liquid for ink jet printing of claim 16, wherein the liquid further comprises a pigment.

18. An ink set for inkjet printing comprising the aqueous treatment liquid of claim 16 and an aqueous ink comprising a colorant.

19. An inkjet recording method, comprising the following steps:

(i) providing a substrate;

(ii) applying the treatment liquid of claim 16 on a surface of the substrate, optionally drying the applied treatment liquid; and (iii) printing an image by jetting an aqueous ink jet ink onto the applied treatment liquid.

* * * * *